Figures 1, 2:
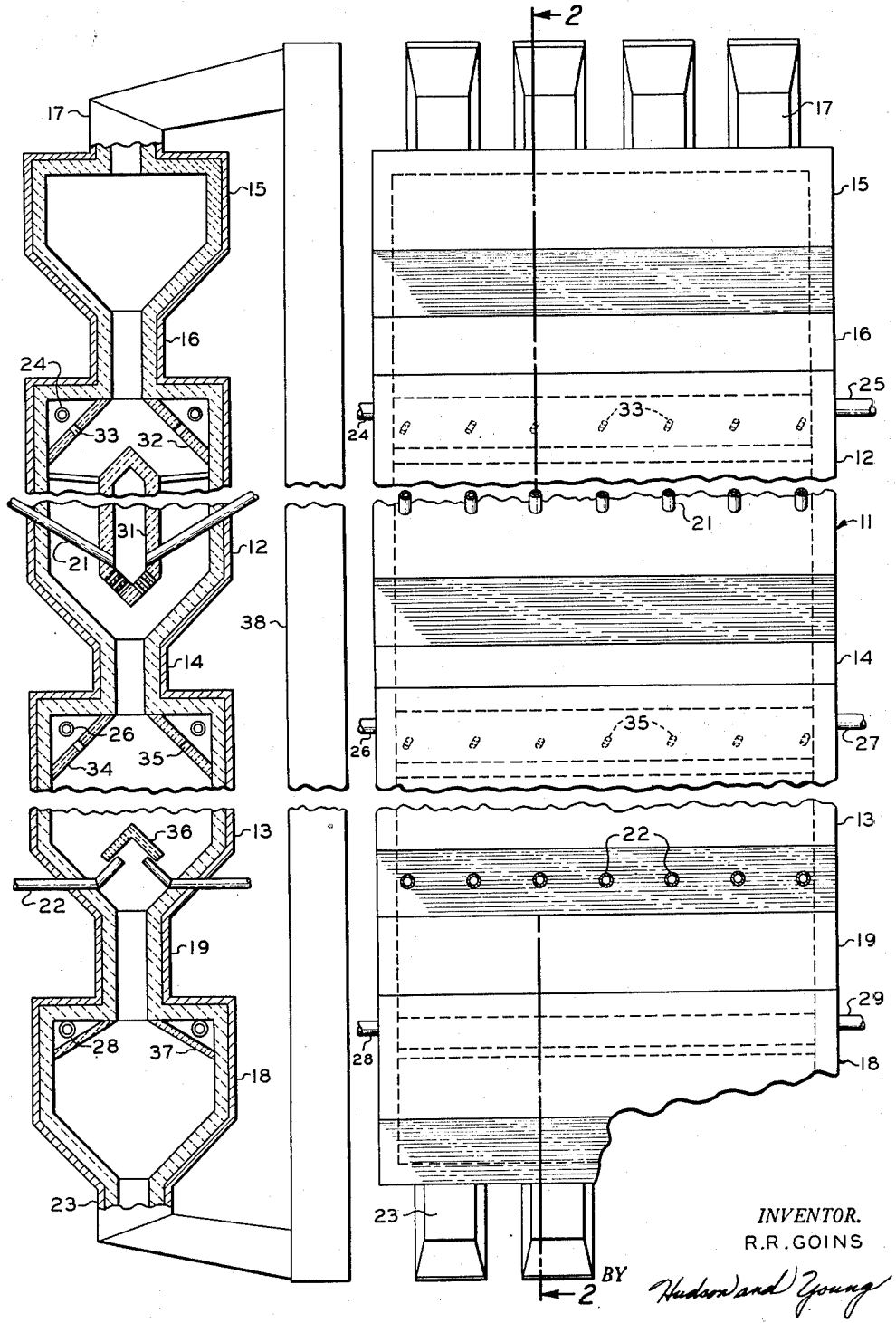

April 21, 1953 — R. R. GOINS — 2,635,864
PEBBLE HEATING AND REACTION CHAMBER
Filed Dec. 28, 1948 — 2 SHEETS—SHEET 1

INVENTOR.
R.R. GOINS
BY Hudson and Young
ATTORNEYS

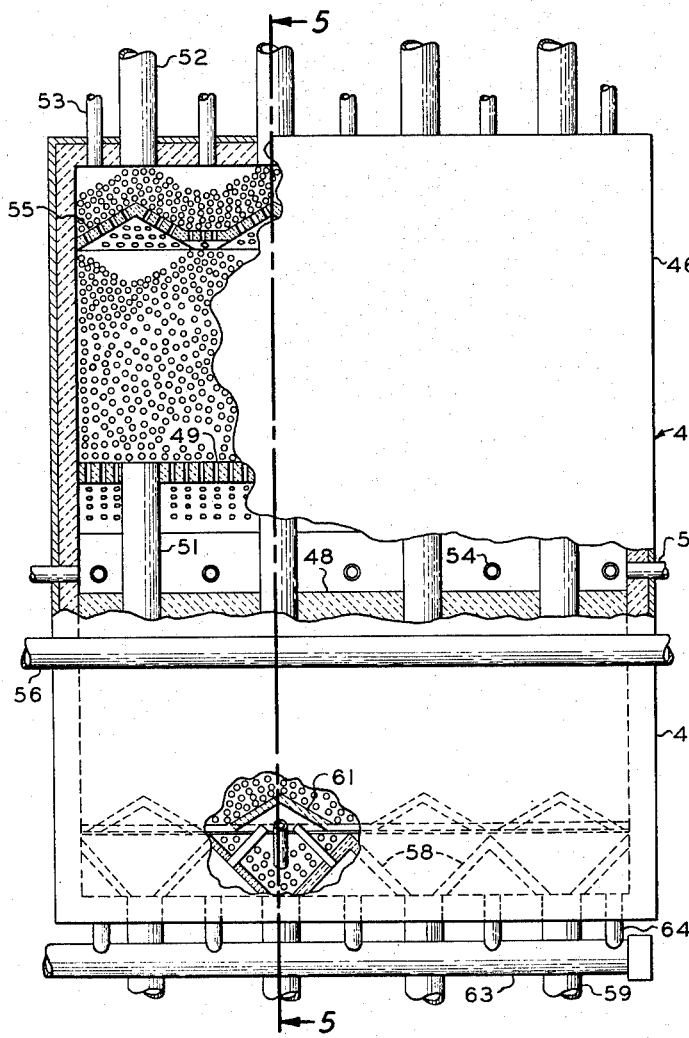
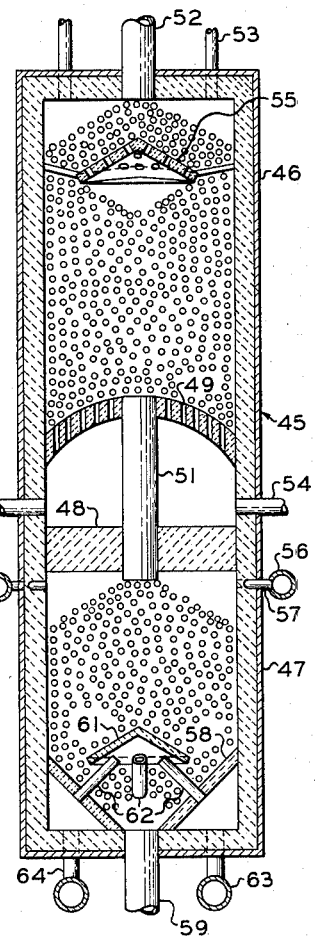
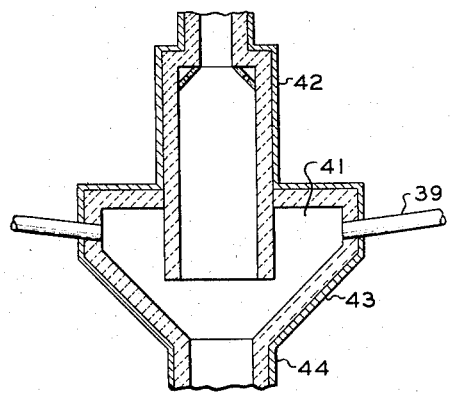
FIG. 4
FIG. 5
FIG. 3
INVENTOR.
R. R. GOINS
BY Hudson and Young
ATTORNEYS Patented Apr. 21, 1953

2,635,864

UNITED STATES PATENT OFFICE 2,635,864

PEBBLE HEATING AND REACTION CHAMBER

Robert R. Goins, Bartlesville, Okla., assignor to Phillips Petroleum Company, a corporation of Delaware Application December 28, 1948, Serial No. 67,676

1 Claim. (Cl. 263—19)

This invention relates to pebble heat exchangers. In one of its more specific aspects it relates to pebble heat exchangers with heat exchange chambers having a high ratio of height to thickness. In another of its more specific aspects it relates to a method of obtaining improved heat exchange between large volumes of fluent solid heat exchange material and gaseous heat exchange material.

Processes which are carried out in so-called pebble heat exchange apparatus utilize a flowing mass of solid heat exchange material, which material is heated or cooled to a desired temperature by passing a first heat exchange fluid therethrough in a first direct heat exchange step and is then caused to contact a second heat exchange fluid in a second direct heat exchange step so as to heat or cool the second heat exchange fluid. Conventional pebble heat exchange apparatus generally comprises two chambers which may be disposed in substantially vertical alignment. The solid heat exchange material is introduced into the upper portion of the first chamber. That solid material forms a fluent bed which flows downwardly through the chamber in direct heat exchange with the first fluid heat exchange material. The solid heat exchange material is heated or cooled to a desired temperature in the heat exchange and is then passed to the lower chamber in which the solid heat exchange material is caused to contact the second fluid heat exchange material in a second direct heat exchange relation.

Conventional pebble heat exchange chambers of pebble heat exchangers are generally formed as cylinders in which solid heat exchange material is collected in the form of a moving or fluent bed. Gaseous heat exchange material is introduced into the lower end of the cylindrical heat exchange material bed formed within the heat exchange chamber and at its periphery. The solid heat exchange material is usually drawn from a substantially central point in the bottom of the solid heat exchange material bed and is passed downwardly into a second heat exchange chamber where a second moving bed of solid heat exchange material is formed. One disadvantage of conventional pebble heat exchange chambers is that it is most difficult to establish uniform flow of solid heat exchange material within the chambers so as to supply uniformly heated or cooled solid heat exchange material from one heat exchange chamber to the other. In the withdrawal of solid heat exchange material from a substantially central point in the bottom of such conventional heat exchange chambers, the moving portion of the solid heat exchange material tends to describe a cone in the lower portion of the chamber. That material which is below and outside of the cone formed by the moving solid heat exchange material remains in what is substantially a stagnant area within the heat exchange chamber. At the same time, when solid heat exchange material is introduced centrally into the upper portion of the heat exchange chamber, the top of the solid heat exchange material bed is formed as an inverted cone extending downwardly and outwardly from the solid material inlet in the top of the chamber. It will thus be seen that that portion of the solid heat exchange material which gravitates through the heat exchange chamber is bounded by a cylindrical periphery and is capped top and bottom by oppositely extending cones. Gaseous heat exchange material which is introduced at the bottom of the solid material bed seeks a path of least resistance upwardly through the solid heat exchange material bed. Inasmuch as the bed is thinner at its outer periphery than at points closer to its axis, the gas tends to channel through that portion of material making up the peripheral portion of the solid heat exchange material bed. The stagnant solid heat exchange material which comes to rest in the stagnant areas formed below the bottom cone of the moving solid heat exchange material bed, having once acted in heat exchange relation with the gaseous heat exchange material, acquires and remains at approximately the temperature of the incoming gas, thus failing to substantially enter into further heat exchange relation with the gaseous heat exchange material. It remains, then, that only the moving portion of the solid heat exchange material will continue to enter into heat exchange with the gas. It will thus be seen that the gaseous heat exchange materials flowing through the peripheral portion of the bed pass through a relatively thin layer of the solid material bed which will enter into a heat exchange relation therewith. For the reasons above described, relatively inefficient heat exchange is obtained in the operation of such an apparatus when compared to the operation of the apparatus of this invention.

Solid heat exchange material which is conventionally used in such heat exchange systems is generally called "pebbles." The term pebbles as used herein denotes any solid refractory material of flowable size and form which is capable of carrying relatively large amounts of heat from one heat exchange chamber to another and which has sufficient strength to withstand the mechanical pressure and thermal changes within the heat exchange chambers without rapid deterioration or substantial breaking. Pebbles which are conventionally used in pebble heat exchangers are substantially spherical in shape and range from about one-eighth inch to about one inch in diameter. In processes utilizing extremely high or extremely low temperatures, pebbles having a diameter of between about one-fourth inch and three-eighths inch are preferred. The pebbles are formed of a refractory material which will withstand temperatures at least as high or as low as the highest or lowest temperature, respectively, attained in the pebble heat exchange chambers. The pebbles most capable of withstanding temperature changes within pebble heater apparatus include such refractory materials as metal alloys, ceramics, or other such materials. Among specific materials which may be used for high temperature operation are silicon carbide, alumina, periclase, beryllia, stellite, zirconia, and mullite, either singly or in admixture with each other or with other materials. Pebbles formed of such materials, when properly fired, serve very well in high temperatures, some withstanding temperatures up to about 4000° F. Pebbles which are used may be either inert or catalytic depending upon the selected process. Materials which may be used in low temperature processes include alumina, aluminum, nickel, cobalt, copper, iron, magnesia and zirconia. These materials also may be used singly or in combination with each other or in combination with other materials to form desirable pebbles. Pebbles formed of such materials serve very well in pebble coolers which operate at temperatures as low as —300° F. At extremely low temperatures, preference is given to pebbles composed of nickel-steel and nickel-copper alloys.

An object of this invention is to provide an improved pebble heat exchanger. Another object of this invention is to provide an improved pebble heat exchanger having a narrow horizontal cross-section. Another object of this invention is to provide an improved pebble heat exchanger having a long horizontal cross-section. Another object of the invention is to provide improved means for more evenly heating or cooling heat exchange pebbles in pebble heat exchange chambers. Another object of the invention is to provide an improved apparatus and method for simultaneously heating and cooling large volumes of heat exchange pebbles. Other and further objects and advantages of this invention will be apparent from the accompanying disclosure.

Understanding of the invention will be facilitated upon reference to the diagrammatic drawings in which Figure 1 is a side elevation of a pebble heat exchanger of this invention. Figure 2 is a vertical section taken along line 2—2 of Figure 1. Figure 3 is a vertical section of a modified pebble heat exchange chamber. Figure 4 is a side elevation, partially in section, of a pebble heat exchanger showing a preferred modification of this invention. Figure 5 is a vertical section taken along line 5—5 of Figure 4.

In Figure 1 of the drawing, pebble heat exchanger 11 comprises an upper heat exchange chamber 12 and a lower heat exchange chamber 13 which communicate at their lower and upper ends, respectively, by means of throat 14. Upper pebble collector chamber 15 is provided above pebble heat exchange chamber 12 and communicates with the upper portion of chamber 12 by means of communicating throat 16. Pebble collector chamber 15 is provided in its upper portion with at least one pebble inlet conduit 17. The number of pebble inlet conduits provided in the upper portion of pebble collector chamber 15 will be dependent upon the depth of chamber 15. If a chamber of sufficient depth is utilized, a single pebble inlet may be provided. The breadth of chamber 15, when a single pebble inlet is utilized, must be such that pebbles entering that inlet and seeking the angle of repose will spread out to each wall of the chamber. The angle of repose is the apex angle of a stationary bed of pebbles which, having been dropped from a central point and maintained as a stationary bed, have arrived at a static position. As the depth of the pebble collector chamber is decreased, however, the number of pebble inlet conduits 17 must be increased so as to allow sufficient disposition of pebbles from wall to wall in chamber 15. Lower pebble collector chamber 18 is provided below chamber 13 and communicates with the lower portion of chamber 13 by means of communicating throat 19. Fluid heat exchange material inlet conduits 21 are provided in the lower portion of chamber 12 and fluid heat exchange material inlet conduits 22 are provided in the lower portion of chamber 13. At least one pebble outlet conduit 23 is provided in the lower portion of pebble collector chamber 18. If pebble collector chamber 18 is of sufficient depth, a single pebble outlet therefrom may be utilized. It will ordinarily be desirable, however, to utilize the same number of pebble outlets from chamber 18 as the number of pebble inlets in chamber 15. Such construction would insure uniform pebble flow through the apparatus. Flushing gas inlet conduit 24 is provided in the upper portion of chamber 12 and effluent outlet conduit 25 is provided in the upper portion of chamber 12 at the end of chamber 12 opposite conduit 24. Flushing gas inlet conduit 26 is provided in the upper portion of chamber 13 and effluent outlet conduit 27 is provided in the upper portion of chamber 13 at the end of chamber 13 opposite inlet conduit 26. Gaseous material inlet conduit 28 and gaseous material outlet conduit 29 are provided in the upper portion of pebble collector chamber 18 and communicate with a preheat exchange zone within the upper portion of pebble collector chamber 18. Throats 14, 16, and 19 are slots which extend from one end wall or a point close thereto to the other end wall or a point close thereto. These throats may be formed of a plurality of slots extending in a line between the two end walls and are preferably positioned equi-distant the side walls of the chambers between which they communicate.

Referring to the device shown in Figure 2 of the drawing, baffle member 31 is centrally provided in chamber 12 so as to form uniform pebble paths between the side walls of chamber 12 and the side walls of baffle 31. In one modification of the invention, baffle 31 may be perforate in its lower end and fluid heat exchange material inlets 21 may extend into baffle 31. In such a modification, fluid heat exchange material is fed into the interior of baffle 31 and baffle 31 acts as a distribution chamber for the fluid heat exchange material. Baffle 31 preferably extends from one end wall of chamber 12 to its other end wall. The upper and lower ends of the baffle are preferably shaped so that the surfaces of the baffle are parallel to adjacent interior surfaces of chamber 12. Interior walls 32 are provided in the upper portion of chamber 12 and form effluent outlet chambers within the upper portion of chamber 12. Effluent outlet conduits 33 communicate between the heat exchange chamber within chamber 12 and the effluent outlet chambers formed within the upper portion of chamber 12. Conduits 33 preferably are formed so as to receive an aspirating effect when flushing gas is passed through the effluent outlet chambers. Conduits 33 preferably extend through walls 32 at an angle and toward effluent outlet conduit 25. Walls 34 in the upper portion of heat exchange chamber 13 form effluent outlet chambers in the upper portion of that chamber. Effluent outlet conduits 35 provide communication between the heat exchange chamber within chamber 13 and the effluent outlet chambers within the upper portion of chamber 13. Conduits 35 are preferably positioned similarly to conduits 33. Baffle member 36 is provided in the lower portion of heat exchange chamber 13 and preferably overlaps the vertical plane in which the walls of throat 19 are maintained. Fluid heat exchange material inlet conduits 22 may communicate with the lower portion of baffle member 36. Baffle member 36 thus forms a fluid heat exchange material distributing zone in its lower portion. Pebble collector chamber 18 may be provided with walls 37 in its upper portion, which walls 37 form preheat exchange zones in the upper portion of chamber 18. Pebble inlet conduit 17 in the upper portion of chamber 15 and pebble outlet conduits 23 in the lower portion of chamber 18 communicate by means of elevator 38. The sloping floors of chambers 12 and 13 form pebble support means in each of those chambers.

In the operation of the device shown in Figures 1 and 2 of the drawing, pebbles are passed into the upper portion of chamber 15 and are distributed therein so as to form a long narrow pebble bed. The pebbles move downwardly through throat 16 as a flowing contiguous mass and into the upper portion of pebble heat exchange chamber 12. The bed of pebbles is divided by baffle member 31 within chamber 12 and the wide, thin contiguous stream of pebbles on each side of baffle member 31 passes downwardly through chamber 12 to be joined together once again in the lower portion of chamber 12. Fluid heat exchange material is injected through fluid heat exchange material inlet conduits 21 into the interior of baffle member 31 in which the fluid heat exchange material is distributed and from the lower portion of which the fluid heat exchange material is injected into the downwardly flowing streams of pebbles on each side of baffle member 31. Because of the constriction formed by throat 14, the fluid heat exchange material passes upwardly through chamber 12 counter the flow of pebbles within chamber 12 and escapes through conduits 33 into effluent outlet chambers in the upper portion of chamber 12. The removal of effluent material from chamber 12 may be accelerated by passing an inert flushing gas, such as steam, into the effluent outlet chambers through conduits 24 and removing the effluent and the flushing gas through effluent outlet conduits 25. Pebbles which have been heated or cooled in the first heat exchange chamber are passed downwardly through throat 14 as a contiguous mass and are passed into the upper portion of heat exchange chamber 13. The pebbles form a fluent pebble bed within chamber 13 and flow downwardly therethrough and out of chamber 13 through throat 19. The pebble beds formed within chambers 12 and 13 are wide and thin as compared to pebble beds in conventional pebble heat exchange chambers. Baffle member 36 retards the flow of pebbles through the central portion of pebble heat exchange chamber 13 and operates to aid in maintaining uniform pebble flow through chamber 13. Fluid heat exchange material is injected through fluid heat exchange material inlet conduits 22 and is passed inwardly to a point adjacent the lower surface of baffle member 36. The fluid heat exchange material is distributed under baffle 36 and passes outwardly and upwardly through the pebble bed within chamber 13. Effluent materials are removed from chamber 13 through effluent outlet conduits 35 and pass into effluent outlet chambers within the upper portion of chamber 13 from which they are removed through effluent outlet conduits 27. Removal of effluent material from chamber 13 may be facilitated by passing an inert flushing gas, such as steam, through the effluent outlet chambers by means of inlet conduits 26 and effluent outlet conduits 27. Pebbles from chamber 13 which pass downwardly through throat 19 are collected in chamber 18 and are distributed to the pebble outlet conduits 23 through which they are removed and are passed to elevator 38 which elevates the pebbles to pebble inlet conduits 17. Gaseous materials may be pre-heated in the upper portion of chamber 18 by passing the materials into the chambers formed between walls 37 and the outer walls of chamber 18. Such gases are injected thereinto through inlet conduit 28 and are removed through outlet conduit 29. Preheat sections may be formed in chamber 18 by the pebbles without the aid of walls 37.

The lower portions of the chambers are shown in the device of Figure 2 of the drawing as sloping downwardly and inwardly toward the pebble outlet of each chamber. It is preferred that the angle formed by the sloping sides of the chamber bottoms form an angle of between 60 and 100°. By forming the chamber bottom in such a manner, stagnant areas are substantially removed from the chamber, thereby maintaining only moving pebbles within each of the chambers, without unduly restricting the chamber capacities for a given height. Baffle members 31 and 36 may be removed from chambers 12 and 13, respectively, when the width of the chambers is sufficiently narrow or identical baffles may be used in each chamber. For best heat exchange without the baffles within chambers 12 and 13, it is preferred to maintain a high ratio of height to width of the pebble bed. The length of the pebble bed will have no effect upon the heat exchange or the pebble flow. Large volumes of pebbles may thus be utilized in such an apparatus without affecting the pebble or gas flow therein. By maintaining the high ratio of height to width of the pebble bed, uniformity of pebble flow is substantially increased over that obtained in conventional pebble heaters. This is especially true when the communicating throats comprise continuous slots extending from one end wall of the heat exchange chamber to the other. In the modifications in which baffles 31 and 36 are removed from chambers 12 and 13, respectively, the fluid heat exchange material may be injected directly into the beds of flowing pebbles. If it is desired to heat the pebbles to relatively high temperatures, fluid may be introduced into the pebble bed so as to support combustion on the surfaces of the pebbles. Uniform fluid heat exchange material distribution will require a large number of inlet conduits 21 and 22 in the side walls of chambers 12 and 13, respectively. Chambers 12 and 13 may be modified as shown in Figure 3 of the drawing so as to provide a bustle member along the lower portion of the chambers. Fluid heat exchange material may be injected through inlet conduits 39 and distributed in chamber 41 formed between the walls of chamber 42 and the walls of chamber 43. The fluid heat exchange material is then passed under the lower end of the walls of chamber 42 and upwardly through chamber 42 in direct heat exchange and counter the flow of pebbles flowing downwardly within chamber 42. Effluent materials are removed from the upper portion of chamber 42 in a manner similar to that utilized and described in connection with chambers 12 and 13. Pebbles are removed from the lower portion of chamber 42 through pebble outlet conduit 44.

The pebble heat exchanger of Figure 4 differs from that of Figures 1 and 2 in several specific respects. Heat exchange chamber 45 comprises upper chamber 46 and lower chamber 47 which are separated by floor 48 and a perforate arch 49 which form a pebble support means therein. Perforate arch 49, which is spaced above floor 48, extends between the lateral walls of heat exchanger 45 so as to form a gas distribution chamber between chambers 46 and 47. Pebble outlet conduits 51 communicate between the lower portion of chamber 46 and the upper portion of chamber 47. Pebble inlet conduits 52 are provided in the upper portion of chamber 46, preferably in vertical alignment with pebble outlet conduits 51. Effluent outlet conduits 53 are disposed in the upper portion of chamber 46, preferably between each pair of pebble inlet conduits 52. Fluid heat exchange material inlet conduits 54 communicate between the fluid heat exchange material supply source and the space formed between perforate arch 49 and floor 48. A baffle similar to baffle 31 may be utilized within chamber 46. One modification which may be utilized would be to employ a baffle such as baffle 55 in the upper portion of chamber 46. Baffle 55 is preferably shaped as a series of pyramids or cones and is perforate so as to allow the passage of gaseous materials therethrough but so as to prevent the passage of pebbles therethrough. Baffle 55 preferably extends from one end wall of chamber 46 to the other end wall. The top of the pyramid portions of baffle 55 are preferably disposed in vertical alignment with pebble inlet conduits 52.

Effluent outlet header 56 is provided along the wall of heat exchange chamber 47 adjacent its upper portion and communicates with the interior of chamber 47 by means of effluent outlet conduits 57. Effluent outlet conduits 57 extend into chamber 47 at points above the pebble bed therein. A fluid heat exchange material distribution chamber is formed below the pebble bed within chamber 47 by walls 58 which form a plurality of connecting cones or pyramids along the length of chamber 47. Pebble outlet conduits 59 extend from the vertex of the cones or pyramids formed by walls 58. Baffle members 61 are provided in the lower portion of chamber 47 above pebble outlet conduits 59 and extend beyond the periphery of a vertical projection of pebble conduit 59. Conduits 62 communicate between fluid heat exchange distribution chamber and the lower surface of baffle member 61. Baffle members 61, which may be flat plates or cones, form a second gas distribution means which distributes the gaseous heat exchange material in the pebble bed within chamber 47. Fluid heat exchange material is injected into chamber 47 through header member 63 and conduits 64 which communicate between header member 63 and the distribution chamber in the lower portion of heat exchange chamber 47. It is also possible, though not preferred, to entirely omit walls 58 and the fluid distribution chambers formed therebelow. This would reduce the number of conduits 62, and the remaining ones would be connected directly to conduits 64 so as to form a direct communication between header member 63 and fluid distributing baffle 61.

The operation of the device shown in Figures 4 and 5 of the drawing is very similar to that described above in connection with the device of Figures 1 and 2 of the drawing. Pebbles are injected into the upper portion of chamber 46 through pebble inlet conduits 52 and pass downwardly over baffle members 55 and form a contiguous fluent bed of pebbles which moves downwardly as a long thin bed. The pebbles are removed from chamber 46 through pebble outlet conduits 51 and are passed into the upper portion of chamber 47 in which a second long thin fluent bed is formed. The pebbles within chamber 47 pass downwardly therethrough, over baffle members 61, and are removed through pebble outlet conduits 59 from which they are passed to elevators (not shown) which elevate the pebbles to pebble inlet conduits 52. Fluid heat exchange material is injected through fluid heat exchange material inlet conduits 54 and 64 in heat exchange chambers 46 and 47, respectively. The gases pass upwardly through the perforations in arch 49 and conduits 62 and upwardly counter the flow of pebbles within chambers 46 and 47, respectively. Effluent material is removed from the upper portion of chambers 46 and 47 by effluent outlet conduits 53 and 57, respectively. The removal of effluent material from chamber 47 may be facilitated by the passage of an inert gas, such as steam, through effluent outlet header 56. A similar header may be provided so as to communicate with effluent outlet conduits 53.

If the width of chambers 46 and 47 is sufficiently narrow, baffle 61 may be removed from chamber 47 together with conduits 62, and wall 58 may be perforated so as to provide communication between the fluid heat exchange material distribution chamber and the pebble bed within chamber 47. Baffles 55 in chamber 46 are desirable mainly for the purpose of establishing a fluid flow somewhat across the actual path of the pebbles, and for the purpose of shortening the residence time of gaseous materials in contact with the pebble bed by creating cavities in the pebble bed through which the gaseous materials pass. The necessity for baffles, such as baffle members 55, may be removed by adapting pebble inlet conduits 52 in such a manner that they may be lengthened or shortened to provide the desired pebble bed depth within the heat exchange chamber.

It is contemplated that the bustle chamber shown in connection with the device of Figure 3 may be utilized in connection with a chamber such as that shown in Figure 4 of the drawing. If such a modification were used, perforate arch 49 would be removed from chamber 46 and the fluid heat exchange material would be injected through the side walls of the chamber. The bustle modification may be used in connection with either chamber 46 or chamber 47. Any of the baffles disclosed in Figures 2, 4 and 5 may be utilized in any one of the chambers disclosed herein. The chambers disclosed herein may also be employed in any combination, so that any chamber disclosed may be substituted for any other, or pairs may be employed in inverted relationship to each other.

It is ordinarily desirable to seal one pebble heat exchange chamber from the other. A partial seal is accomplished by the pebble mass within the constricted pebble throats. In order to increase the sealing effect therein it is desirable to inject an inert gas, such as steam, into the throats immediately above and below one of the heat exchange chambers. Best results are ordinarily obtained if the lower heat exchange chamber is sealed off by the injection of steam into its communicating throats.

Various other modifications will be obvious to those skilled in the art upon study of the above disclosure. Such obvious modifications are believed to be within the spirit and the scope of such disclosure.

I claim:

A pebble heat exchanger comprising in combination an upright, laterally elongated, closed outer shell having two pairs of parallel sides; a closure member extending laterally between each of the walls of said shell so as to divide the chamber formed within said shell into an upper section and a lower section; a perforate refractory arch extending laterally between each of the walls in the lower portion of the upper chamber section, forming a gas distribution zone between said arch and said closure member and a pebble heat exchange zone above said arch; pebble conduit means disposed along the length of said chamber, spaced equidistant from the side walls thereof, and extending through said perforate arch and said closure member to said lower chamber section; an inlet conduit extending through said shell into said gas distribution zone; pebble inlet conduit means in the upper end of said shell; gaseous effluent conduit means only in the upper end of said upper chamber section; a first header member positioned along one elongated side of said shell; a second header member positioned along the opposite side of said shell; first gaseous effluent conduit means in said shell extending only from one side of the upper portion of said lower chamber section to said first header member; second gaseous effluent conduit means in said shell extending from the opposite side of the upper portion of said lower chamber section to said second header member; pebble outlet conduit means in the lower end of said shell, equidistant the side walls of said shell; fluid inlet means extending through said shell into the lower portion of said lower chamber section; and elevator means extending from said pebble outlet conduit means in the lower end of said shell to said pebble inlet conduit in the upper end of said shell.

ROBERT R. GOINS.

References Cited in the file of this patent

UNITED STATES PATENTS

| Number | Name | Date |
|---|---|---|
| 278,356 | Niese et al. | May 29, 1883 |
| 1,141,546 | Hess | June 1, 1915 |
| 1,178,667 | Niewerth | Apr. 11, 1916 |
| 1,459,326 | Dow | June 19, 1923 |
| 1,905,883 | Barstow et al. | Apr. 25, 1933 |
| 2,069,192 | Behr et al. | Jan. 26, 1937 |
| 2,180,968 | Schorn et al. | Nov. 21, 1939 |
| 2,379,195 | Simpson et al. | June 26, 1945 |
| 2,445,092 | Utterback | July 13, 1948 |
| 2,445,554 | Bergstrom | July 20, 1948 |
| 2,447,306 | Bailey et al. | Aug. 17, 1948 |
| 2,458,434 | Simpson | Jan. 4, 1949 |
| 2,505,257 | Quigg | Apr. 25, 1950 |
| 2,518,842 | Weber | Aug. 15, 1950 |
| 2,530,274 | Weber | Nov. 14, 1950 |
| 2,534,090 | Weber et al. | Dec. 12, 1950 |
| 2,536,436 | Goins | Jan. 2, 1951 |
| 2,555,052 | Morse | May 29, 1951 |

FOREIGN PATENTS

| Number | Country | Date |
|---|---|---|
| 10,460 | Germany | Sept. 28, 1880 |